(12) United States Patent
Hohenberger et al.

(10) Patent No.: US 8,189,938 B2
(45) Date of Patent: May 29, 2012

(54) ENHANCED INFRARED IMAGING SYSTEM

(75) Inventors: Roger T. Hohenberger, Windham, NH (US); Philip R. Braica, New Boston, NH (US)

(73) Assignee: L-3 Insight Technology Incorporated, Londonderry, NH (US)

( * ) Notice: Subject to any disclaimer, the term of this patent is extended or adjusted under 35 U.S.C. 154(b) by 1178 days.

(21) Appl. No.: 11/970,719

(22) Filed: Jan. 8, 2008

(65) Prior Publication Data

US 2008/0166061 A1 Jul. 10, 2008

Related U.S. Application Data

(60) Provisional application No. 60/884,243, filed on Jan. 10, 2007.

(51) Int. Cl.
*G06K 9/40* (2006.01)
*G06K 9/20* (2006.01)
*B60Q 1/00* (2006.01)

(52) U.S. Cl. ............... 382/254; 382/283; 340/435

(58) Field of Classification Search ......... 382/274–275, 382/254, 312, 103, 236, 209, 218, 252; 348/151–169, 241; 250/252.1, 339.09; 340/435
See application file for complete search history.

(56) References Cited

U.S. PATENT DOCUMENTS

| 5,001,558 | A | * | 3/1991 | Burley et al. | 348/164 |
| 5,534,694 | A | * | 7/1996 | Ball et al. | 250/330 |
| 6,150,930 | A | * | 11/2000 | Cooper | 340/435 |
| 6,232,602 | B1 | * | 5/2001 | Kerr | 250/330 |
| 6,759,949 | B2 | * | 7/2004 | Miyahara | 340/435 |
| 7,130,448 | B2 | * | 10/2006 | Nagaoka et al. | 382/104 |
| 7,242,803 | B2 | * | 7/2007 | Miller | 382/173 |
| 7,307,793 | B2 | * | 12/2007 | Ottney et al. | 359/634 |
| 7,321,119 | B2 | * | 1/2008 | King | 250/330 |
| 7,525,448 | B1 | * | 4/2009 | Wilson et al. | 340/971 |
| 7,936,903 | B2 | * | 5/2011 | Ekin | 382/104 |
| 7,982,783 | B2 | * | 7/2011 | Izawa | 348/241 |
| 7,995,859 | B2 | * | 8/2011 | Hogasten | 382/275 |

OTHER PUBLICATIONS

Morin, "Adaptive Spatial Filtering Techniques for the Detection of Targets in Infrared Imaging Seekers", Proceedings of SPIE, vol. 4025, 2000, pp. 182-193.*

* cited by examiner

*Primary Examiner* — Andrae S Allison
(74) *Attorney, Agent, or Firm* — L-3 Communications

(57) ABSTRACT

A vision system has an infrared detector that adjusts the amount of filtering based on the thermal content of a scene being imaged.

16 Claims, 4 Drawing Sheets

ENHANCED INFRARED IMAGING SYSTEM

CROSS REFERENCE TO RELATED APPLICATIONS

The present application claims the benefit of U.S. provisional patent application Ser. No. 60/884,243, filed on Jan. 10, 2007, the entire disclosure of which is incorporated herein by reference.

BACKGROUND OF THE INVENTION

Thermal imaging devices allow an operator to see people and objects because they emit thermal energy. These imagers may be monoculars, binoculars, and goggles, whether handheld, weapon mounted, or helmet mounted. These devices operate by capturing a portion of the infrared light spectrum, which is emitted as heat by objects or reflected by the objects instead of simply being reflected as visible light. Hotter objects, such as warm bodies, emit more of this wavelength than cooler objects like trees or buildings. Since the primary source of infrared radiation is heat or thermal radiation, any object that has a temperature radiates in the infrared. In addition, the reflectivity of an object may make it appear hotter or colder depending on the surrounding infrared sources and the emissivity of the object.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
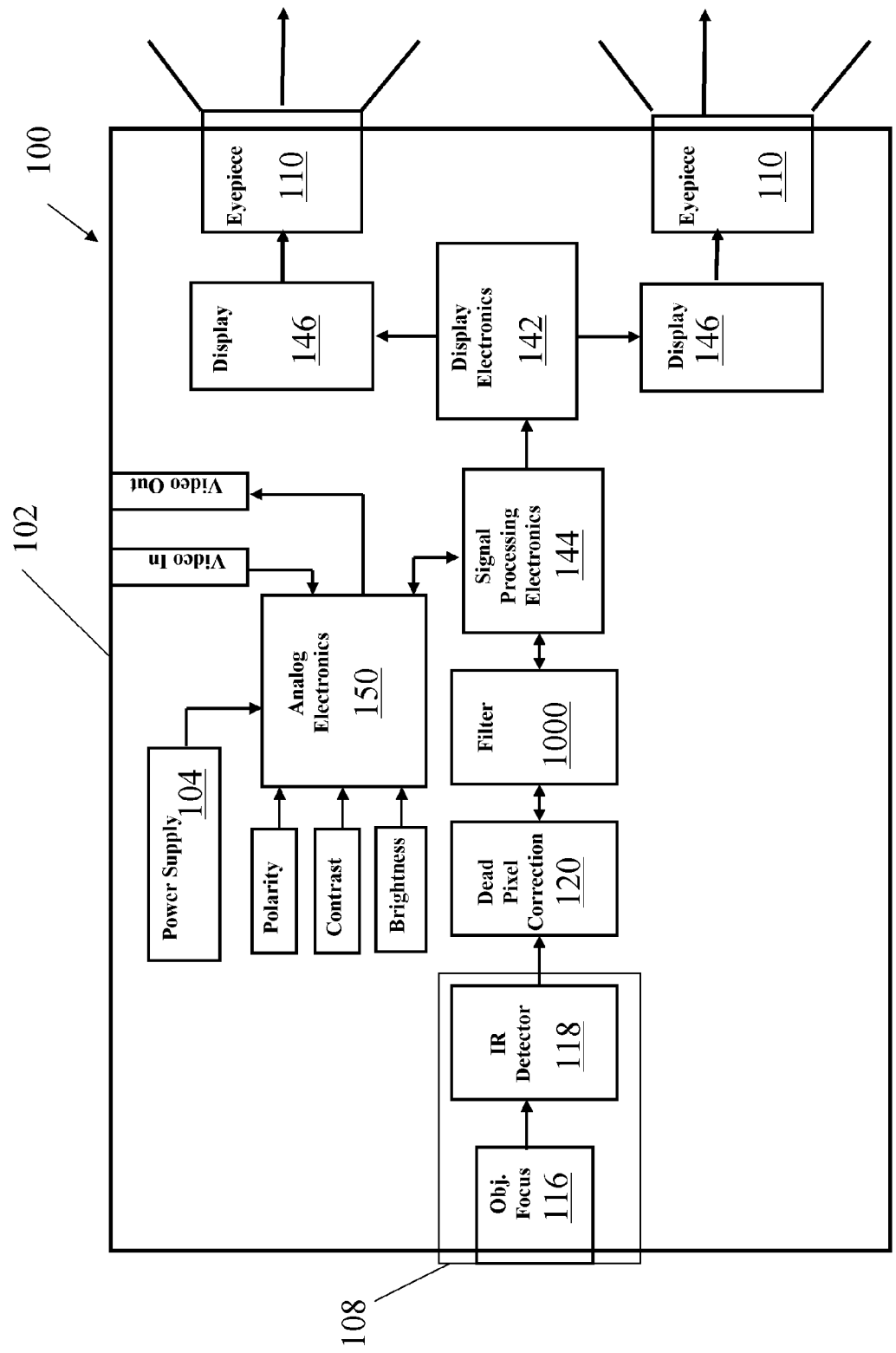
FIG. 1 is a block diagram of an infrared imaging system consistent with one embodiment of the invention.

FIG. 1 is a block diagram of an infrared imaging system 100 consistent with one embodiment of the invention. The system electronics and optics may be housed in a housing 102, which can be hand held or mounted to a helmet or weapon, and may be powered by an internal or external power supply 104, for example batteries. Information from an infrared channel 108 may be presented for viewing by an operator through one or more eyepieces 110 aligned with one or more displays 146. The eyepieces 110 may have one or more ocular lenses for magnifying and focusing the scene image. The infrared channel 108 may have a detector 118 configured to detect scene information in a range of wavelengths (~750 nm–~14,000 nm) and an objective focus 116. The detector 118 may be a short wave infrared (SWIR) sensor, for example an electronic bombardment active pixel simulation sensor (EBAPS), a medium wave sensor, or a long wave sensor, for example a focal plane array or microbolometer. Other infrared sensors may be used without departing from the invention. The imaging system 100 may also have a dead pixel correction circuit 120, a filter 1000, analog electronics 150, signal processing electronics 144, and display electronics 142. The dead pixel correction circuit 120 may be configured to replace any dead pixel, which typically outputs a value of zero, with a value from an adjacent pixel or pixels. Brightness control, contrast correction, and polarity inversion (changing white pixels to black and vice versa) may be done in the analog electronics 150 or signal processing electronics 144 and calculation of an automatic gain control value for "F" may be done in the signal processing electronics 144 and applied in the filter 1000.

Figure 2:
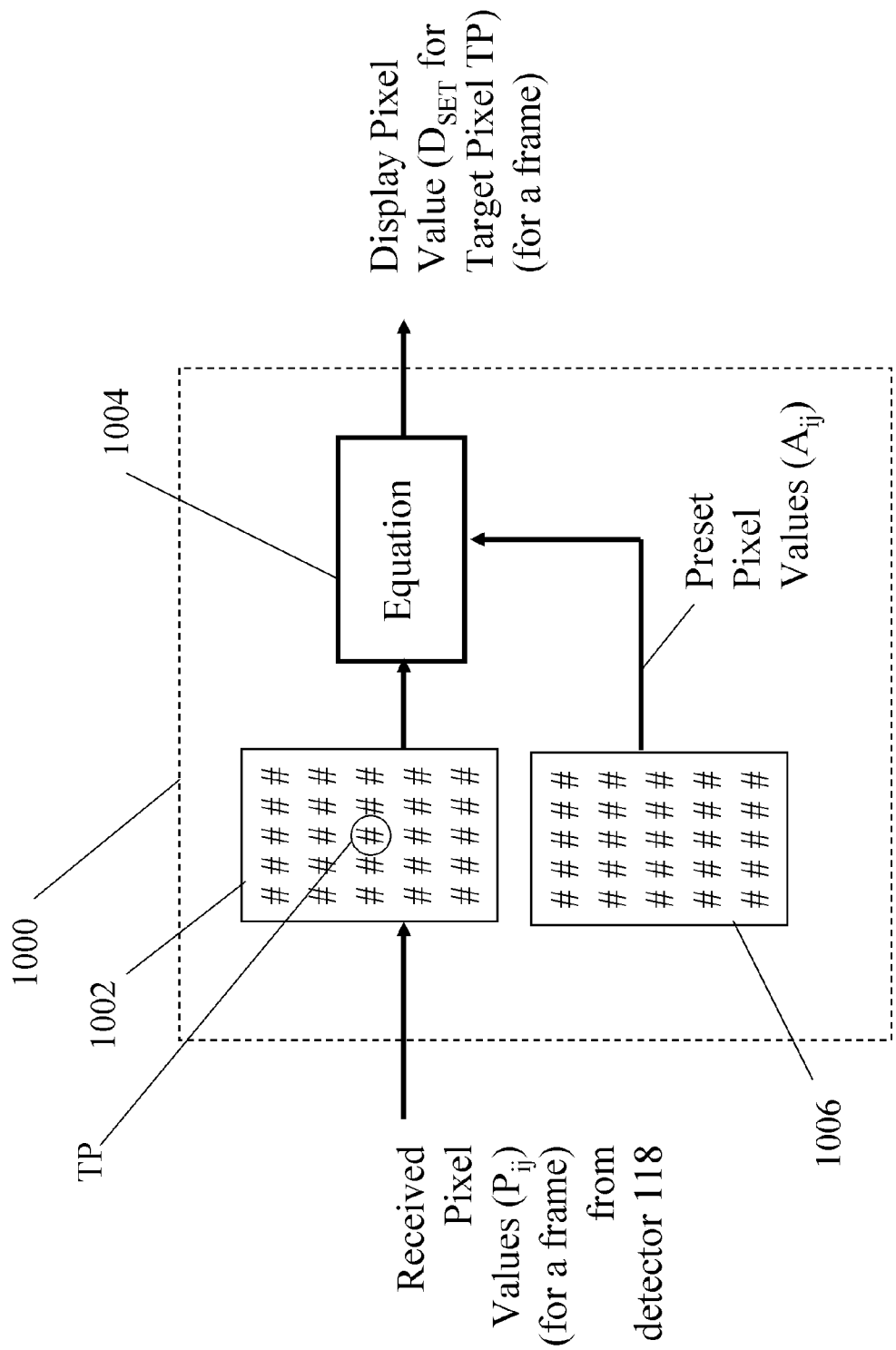
FIG. 2 is a block diagram of a filter circuit consistent with one embodiment of the invention.

As shown in FIG. 2, the filter 1000 may include a multi-row, multi-column buffer 1002; a multi-row, multi-column convolver 1004; and a multi-row, multi-column convolver kernel 1006. The filter 1000 may be incorporated into processing logic embedded in a programmable logic device or other digital image processing devices.

In the infrared imaging system 100, light entering the infrared channel 108 may be sensed by a two-dimensional array of infrared-detector elements in the detector 118. The output may be a digital image represented by a finite number of bits, for example 10 bits. In a 10 bit infrared imager for example, the output may range from zero to ~1000. These bits can represent temperature gradients as small as 0.025° C. and are typically displayed as white, black or shades of gray pixels, although the bits can also be converted to colored pixels. White pixels are typically used to display hotter objects and black pixels used to display colder objects, although the associated colors can be swapped without departing from the invention.

The output from the dead pixel correction circuit 120 may be inputted into the filter 1000 as received pixel values arranged in a plurality of rows and columns. The received pixel values may be filtered by the filter 1000 before being displayed as display pixel values in the display(s) 146 for viewing by the operator.

The filter 1000 may receive a 5×5 matrix of received pixel values ($P_{ij}$) and hold them in the buffer 1002. The filter 1000 may then calculate a display pixel value $D_{SET}$ for a target pixel TP based on the received pixel values ($P_{ij}$), a center value "F", and a 5×5 matrix of preset values ($A_{ij}$). The center value "F" may be determined based on the plot shown in FIG. 3 (discussed below). The matrix of preset values "A", "B", "C", "D" and "E" of ($A_{ij}$) may be a symmetric matrix of values based on a desired spatial content. The desired spatial content may be determined by reviewing a variety of photos or test patterns and varying the preset kernel values until an "optimum" picture results. The preset kernel values of $A_{ij}$ may be positive or negative and may be hardware dependent.

The filter may calculate the value $D_{SET}$ using the formula:

$$D_{SET} = \frac{1}{N}\sum P_{ij} * A_{ij}$$

where $P_{ij}$ may be a matrix of the received pixel values (for example a 5×5 matrix), $A_{ij}$ may be a matrix of the preset and adaptable kernel filter values (for example a 5×5 matrix), and N equals the sum of $A_{ij}$.

Other filters and formulas may be used without departing from the invention. Suitable filters with formulas include filters that perform less enhancement when the thermal content is low so the system is not trying to enhance noise and performs increasing filtering as the thermal content increases so the filter acts to enhance scene information. The value for "F" is ideally set such that the noise is constant so "F" is proportional to the signal-to-noise ratio which increases the gain of the filter as the thermal scene content increases.

The display value $D_{set}$ may be calculated for each pixel, except pixels near the edges. This is repeated for each frame, which may be 60 frames/second. The display values for all the pixels are then set to the signal processing electronics 144 and then on to the display electronics 142.

Figure 3:
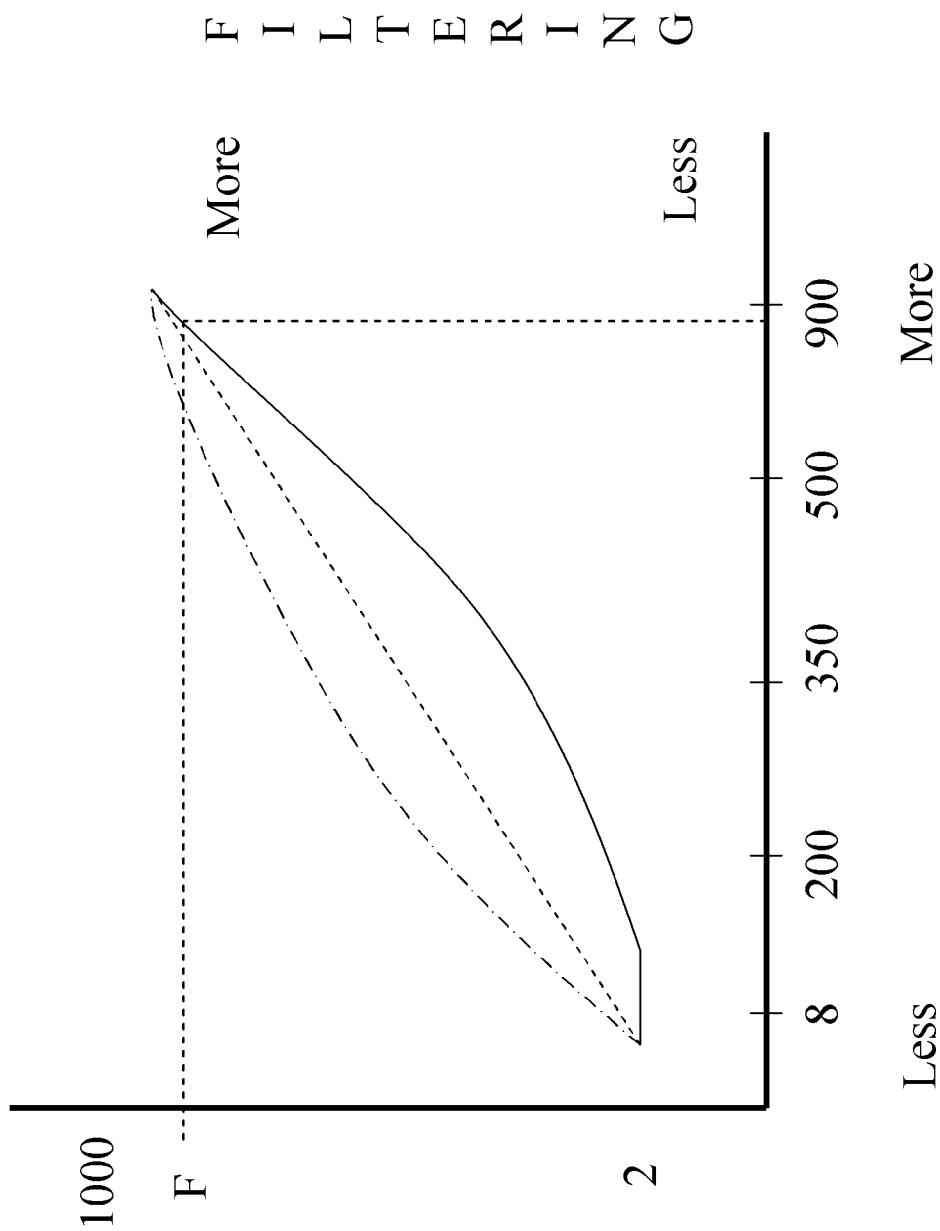
FIG. 3 is a plot of how a center value may be determined based on the amount of thermal content of a frame consistent with one embodiment of the invention.
Figure 4:
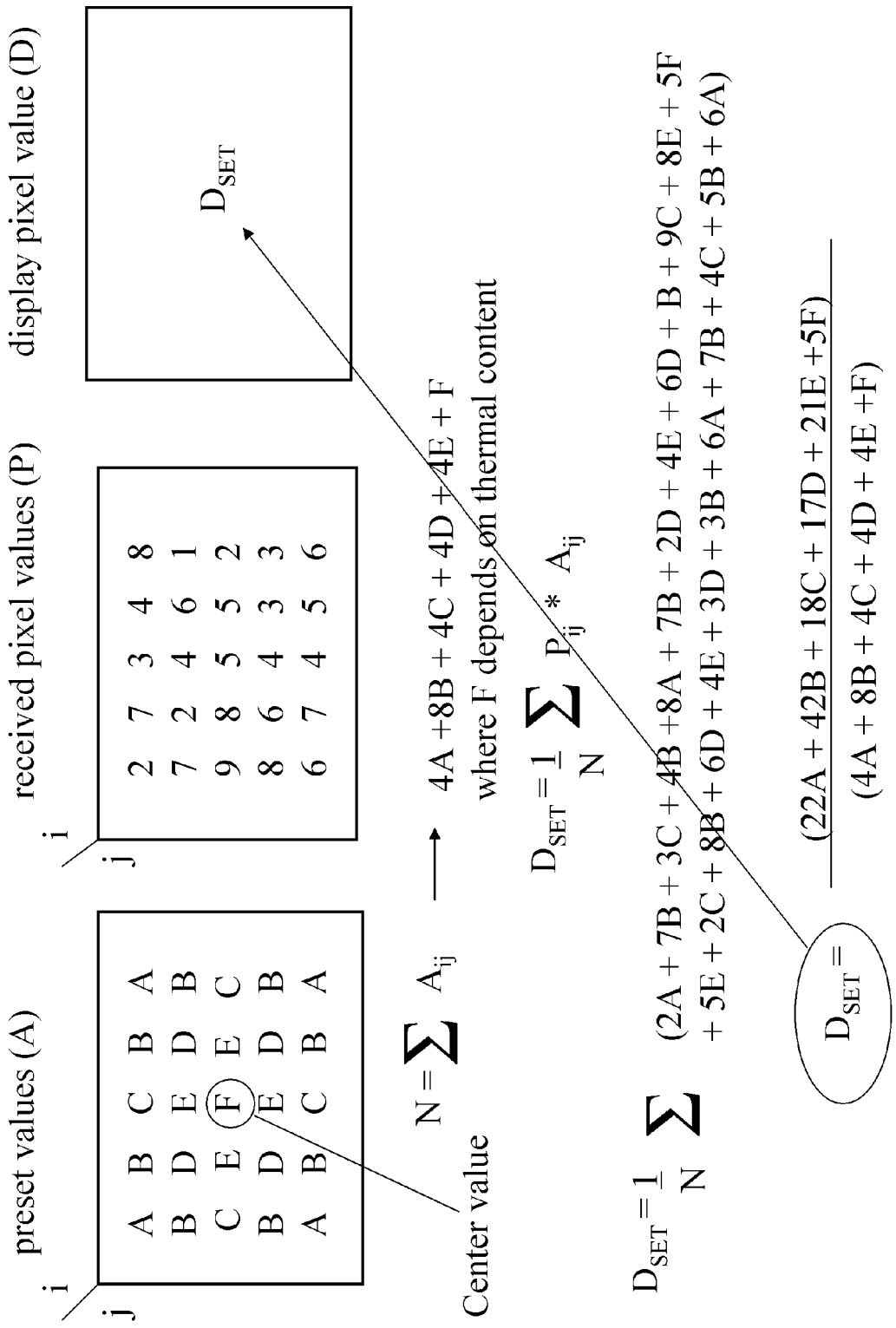
FIG. 4 is a diagram useful in understanding the filter of FIG. 2.

FIG. 3 is a plot of how the center value "F" may be determined based on the amount of thermal content in a frame in an infrared imager consistent with one embodiment of the invention. The range of values for the received pixel values may be between 0 and 1024 for a 10 bit imager. Other ranges, including negative values, may be received, without departing from the invention. The plot is intended to show that in scenes with low thermal content (for example a blank wall of generally uniform temperature, i.e. the received pixel values are all centered about an average pixel value with variation generally representing noise) the value for "F" may be set low and therefore the system performs less filtering. When the scene has higher thermal content (for example an outdoor scene with people and objects at a variety of temperatures ranging from cold to hot, i.e. a large difference in the received pixel values) the value for "F" may be set high and therefore the system performs more enhancement. Plots of other imagers may differ in shape, but should not be considered outside of the invention. The plot may have a positive, negative, or zero curvature without departing from the invention.

Alternatively, the value for "F" may not be continuous, but may only have a fixed quantity of values, for example if the thermal content is low, "F" may be set to 10; if the thermal content is medium, "F" may be set to 200; and if the thermal content is high, "F" may be set to 900. The value for F may be determined based on the present frame or a prior frame, for example the immediately prior frame The thermal content of a scene may be calculated in a variety of ways. The thermal content may be calculated by determining the difference between the lowest received pixel value and the highest received pixel or the difference between the lowest received pixel value of interest and the highest received pixel of interest. Received pixel values may be positive or negative.

Alternatively, a histogram may be used in order to calculate the thermal content. The system can compute a histogram of the image and then discard pixel values that are rare, which may be noise or stray values. This can be done by integrating across the histogram until N % (N=some number, for example 4%) of the total image is found in the histogram. The thermal content could be calculated by determining the difference between the $96^{th}$ percentile and the $4^{th}$ percentile values. Other percentiles can be used without departing from the invention.

Alternatively, a cluster may be used in order to calculate the thermal content. The system could examine the image and find the lowest and highest temp of a cluster of pixels. The system could then discard scattered tiny values that are very high/low, like histograming, but helps ensures that the values are clustered. If the system discovers separate white dots (for example people very far away in a field) and treated them as the hottest value by histograming, the system would reserve output gray levels for these stray pixel values, thereby reducing the amount of gray levels for the reminder of the field. By clustering, the system could reserve all the gray levels for the field and the individual hot pixels could still be bright and the field would have detail. Only when a person was close enough that several pixels light up near each other would that trigger a useful high.

Alternatively, the thermal content could be user selected. After the system measures the scene in some way (high/low, histogram, clustering, etc.) the user could then choose to expand, contract, shift what part they are going to observe. So for example if there was a scene with tanks and people and grass, an AUTO setup could provide a good image, but the user might adjust gain/offset so that people and tanks have no detail, and the grass is enhanced. In this case the user's preferences determine what goes through the imager, and thus the dynamic range and enhancement is based on the user's settings. This would allows a user to adjust for ambient (walking around) then re-adjust for person recognition, then again for shooting, etc. The system could be set up to use histograming and then provide auto and manual user modes that either rely on the histogram or use it for the reference to the user's control, or provide absolute user control. Users can partially (increase/decrease relative to the auto value) or fully (absolute set gain offset to a value) determine the set of values used to determine the dynamic range.

Although the convolver is shown as being 5×5, other sized convolvers, smaller (e.g., 3×3) and larger (e.g., 7×7, 9×9, . . . ) may be used without departing from the invention. Other gradient and edge enhancement filters with alternate convolution weighting, for example a Gaussian filter, a Laplacian, a sharpening filter, a bandpass filter or any combination of the aforementioned, may be used without departing from the present invention.

In one embodiment, a dual band system fusing two sensors (for example a thermal detector and image intensifier) is used where one waveband provides cueing information (thermal detection) and the second waveband provides higher resolution for recognition (image intensification). The lower resolution detector may be used for detection passes through the filter to enhance the edges of the target. Thresholding of the edges provides an outline of the target without masking the target. This may be performed by zeroing the values of the high pass filter, which do not exceed a pre-set threshold. When added to the signal from the higher resolution sensor, the resultant information can include the outline of the target from the low resolution sensor and the higher resolution of the second sensor with zero added content from the low resolution with the exception of the outline. This may provide the system with both improved detection and recognition within the fused image. U.S. patent application Ser. No. 11/928,328 entitled Fusion Vision System discloses an outline filter and method of fusing two or more images and is incorporated herein by reference in its entirety.

According to one aspect there is provided a vision system having a filter circuit, a processor and an infrared detector at least partially enclosed within a housing for improving viewability of a scene. The filter being configured to enhance the data received from the detector more when the thermal content is larger than when it is smaller.

In another aspect, there is provided a method of displaying information representative of a scene by acquiring information representative of the scene from a first channel; filtering the acquired information more when the thermal content is large than when the thermal content is small; and displaying the output for viewing by an operator.

In a further aspect, there is provided a vision system having an infrared detector and a processor for processing scene information acquired by the detector. The filter being configured to set the amount of filtering based on a thermal content of received scene information and outputting the processed information to a display for an operator.

Although several embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A method of displaying information representative of a scene, comprising the steps of:
   acquiring information representative of the scene from a detector configured to process information in a first range of wavelengths;
   filtering the acquired information more as the amount of thermal content is increased; and
   displaying an output for viewing by an operator, further comprising the step of calculating a display value for a display target pixel based on received values of surrounding pixels, wherein the display value equals approximately $$\frac{1}{N}\sum P_{ij}*A_{ij}$$

where $P_{ij}$ is a matrix of received pixel values, $A_{ij}$ is a matrix of kernel values, and N equals the sum of $A_{ij}$.

2. The method of displaying information of claim 1, wherein the first range of wavelengths is approximately 750 nm-14,000 nm.

3. The method of displaying information of claim 2, wherein the first range of wavelengths is approximately 7,000 nm-14,000 nm.

4. The method of displaying information of claim 1, wherein the acquiring information step comprises generating a two-dimensional intensity mapping of the scene.

5. The method of displaying information of claim 4, wherein the intensity mapping comprises a plurality of individual pixels arranged in rows and columns.

6. The method of displaying information of claim 5, wherein the intensity mapping has a received target pixel surrounded by a plurality of surrounding received pixels.

7. The method of displaying information of claim 1, wherein the display value is displayed in the display for viewing by an operator.

8. The method of displaying information of claim 1, wherein the thermal content is calculated by determining the difference between the lowest received pixel value of interest and the highest received pixel value of interest.

9. A vision system for viewing a scene, comprising:
   a housing;
   an infrared detector at least partially disposed within the housing;
   a filter coupled to the detector for filtering an output of the detector and generating a new output, the filter configured to set the amount of filtering based on a thermal content of received information; and
   a display for displaying the new output for an operator wherein the filter calculates a display value for a display target pixel based on a received value of pixels, wherein the display value equals approximately $$\frac{1}{N}\sum P_{ij}*A_{ij}$$

where $P_{ij}$ is a matrix received pixel values, $A_{ij}$ is a matrix of kernel values, and N equals the sum of $A_{ij}$.

10. The vision system of claim 9, wherein a greater amount of thermal content results in a greater amount of filtering.

11. The vision system of claim 9, wherein the thermal content is calculated by determining the difference between the lowest received pixel value of interest and the highest received pixel value of interest.

12. The vision system of claim 9, wherein the detector detects in a range of wavelengths from approximately 750 nm to approximately 14,000 nm.

13. The vision system of claim 12, wherein the range of wavelengths is from approximately 7,000 nm to approximately 14,000 nm.

14. The vision system of claim 9, wherein the display has a plurality of individual pixels arranged in rows and columns.

15. The vision system of claim 9, wherein the display value is displayed in the display for viewing by an operator.

16. The vision system of claim 9, wherein the filter comprises a multi-row, multi-column buffer and a multi-row, multi-column convolver.

* * * * *